(12) United States Patent
Moon et al.

(10) Patent No.: US 10,374,516 B2
(45) Date of Patent: Aug. 6, 2019

(54) NON ZERO-VOLTAGE SWITCHING (ZVS) DETECTION IN RESONANT CONVERTERS

(71) Applicant: FAIRCHILD KOREA SEMICONDUCTOR LTD., Bucheon (KR)

(72) Inventors: Sangcheol Moon, Bucheon (KR); Jintae Kim, Sungnam-si (KR); Hangseok Choi, Suwon (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 15/668,974

(22) Filed: Aug. 4, 2017

(65) Prior Publication Data
US 2018/0054111 A1    Feb. 22, 2018

Related U.S. Application Data

(60) Provisional application No. 62/377,063, filed on Aug. 19, 2016.

(51) Int. Cl.
*H02M 3/335* (2006.01)
*H02M 1/36* (2007.01)
(Continued)

(52) U.S. Cl.
CPC ...... *H02M 3/33515* (2013.01); *H02H 1/0007* (2013.01); *H02M 1/08* (2013.01);
(Continued)

(58) Field of Classification Search
CPC .......... Y02B 70/1433; H02M 3/33507; H02M 3/33523; H02M 3/33546; H02M 3/33553
(Continued)

(56) References Cited

U.S. PATENT DOCUMENTS

| 5,973,943 | A  | 10/1999 | Ribarich et al. |
| 6,256,210 | B1 | 7/2001  | Strijker et al. |

(Continued)

OTHER PUBLICATIONS

Keeping, Steven, Digi-Key Electronics, "A Review of Zero-Voltage Switching and Its Importance to Voltage Regulation," May 7, 2017.
(Continued)

*Primary Examiner* — Alex Torres-Rivera
(74) *Attorney, Agent, or Firm* — Brake Hughes Bellermann LLP (57) ABSTRACT

According to an implementation, a resonant converter for detecting non-zero voltage switching includes an oscillator configured to generate a first clock signal to drive a first power switch, and a second clock signal to drive a second power switch. The resonant converter includes a non-zero voltage switching (non-ZVS) detection circuit configured to receive an integrated current sense signal sensed on a primary side of a transformer of a resonant network, and determine a polarity of a voltage of the integrated current sense signal at a predetermined point in the first clock signal or the second clock signal during a switching cycle. The non-ZVS detection circuit is configured to detect a non-ZVS event based on the polarity of the voltage of the integrated current sense signal at the predetermined point in the first clock signal or the second clock signal during the switching cycle.

18 Claims, 9 Drawing Sheets

(51) Int. Cl.
*H02M 1/32* (2007.01)
*H02M 3/337* (2006.01)
*H02H 1/00* (2006.01)
*H02M 1/08* (2006.01)
*H02M 1/00* (2006.01)

(52) U.S. Cl.
CPC ............ *H02M 1/083* (2013.01); *H02M 1/32* (2013.01); *H02M 1/36* (2013.01); *H02M 3/3376* (2013.01); *H02M 3/33523* (2013.01); *H02M 3/33546* (2013.01); *H02M 2001/0009* (2013.01); *H02M 2001/0035* (2013.01); *H02M 2001/0054* (2013.01); *Y02B 70/1433* (2013.01); *Y02B 70/1491* (2013.01); *Y02B 70/16* (2013.01)

(58) Field of Classification Search
USPC ........................................... 363/21.02, 21.03
See application file for complete search history.

(56) References Cited

U.S. PATENT DOCUMENTS

| | | | |
|---|---|---|---|
| 6,331,755 | B1 | 12/2001 | Ribarich et al. |
| 6,496,387 | B2 | 12/2002 | Halberstadt |
| 6,879,115 | B2 | 4/2005 | Ribarich |
| 7,116,561 | B2 | 10/2006 | Osaka |
| 7,323,825 | B2 | 1/2008 | Hwang et al. |
| 7,750,615 | B2 | 7/2010 | Jung et al. |
| 8,014,176 | B2 | 9/2011 | Melanson et al. |
| 8,737,101 | B2 | 5/2014 | Cho et al. |
| 9,203,318 | B2 | 12/2015 | Scibilia |
| 9,647,528 | B2 * | 5/2017 | Lee .................. H02M 1/32 |
| 2009/0244934 | A1 | 10/2009 | Wang et al. |
| 2010/0202170 | A1 | 8/2010 | Kim et al. |
| 2012/0307530 | A1 | 12/2012 | Miyazaki |
| 2015/0003117 | A1 | 1/2015 | Ferrazza et al. |
| 2015/0229220 | A1 * | 8/2015 | Lee .................. H02M 1/32 363/21.03 |
| 2018/0054134 | A1 | 2/2018 | Moon et al. |

OTHER PUBLICATIONS

Abdel-Rahman, Sam, Infineon Technologies North America (IFNA) Corp., "Resonant LLC Converter: Operation and Design," V1.0 Sep. 2012.

STMicroelectronics, "AN2644 Application Note, An Introduction to LLC Resonant Half-Bridge Converter," Sep. 2008.

STMicroelectronics, "L6699 Enhanced High Voltage Resonant Controller," Jan. 2013.

Fairchild Semiconductor, now part of ON Semiconductor, "FAN7631 Advanced Pulse Frequency Modulation (PFM) controller for Half-Bridge Resonant Converters," Apr. 2012.

STMicroelectronics, "L6699 Enhanced High-Voltage Resonant Controller," 2017.

ON Semiconductor, "NCP1399: Current Mode Resonant Controller with Integrated High Voltate Drivers, High Performance," May 21, 2017.

ON Semiconductor, "NPC1399 Series High Performance Current Mode Resonant Controller with Integrated High-Voltage Drivers," Jan. 2017.

Fairchild Semiconductor, now part of ON Semiconductor, "AN-6104 LLC Resonant Converter Design Using FAN7688," Sep. 16, 2015.

STMicroelectronics, "STCMB1 TM PFC with X-Cap Discharge and LLC Resonant Combo Controller," 2017.

Shenzhen Ming Feng Wei Electronics Co., Ltd., "Supply TEA1916T NXP NXP Synchronous Rectifier Controller," May 7, 2017.

* cited by examiner

NON ZERO-VOLTAGE SWITCHING (ZVS) DETECTION IN RESONANT CONVERTERS

RELATED APPLICATIONS

This application claims priority to and the benefit of, under 35 U.S.C. § 119, U.S. Provisional Patent Application No. 62/377,063, filed Aug. 19, 2016, which is hereby incorporated by reference in its entirety.

This application is related to U.S. patent application Ser. No. 15/668,975, filed on Aug. 4, 2017, U.S. patent application Ser. No. 15/668,980, filed on Aug. 4, 2017, and U.S. patent application Ser. No. 15/668,983, filed on Aug. 4, 2017, each of which is incorporated by reference in its entirety.

TECHNICAL FIELD

This description relates to improving operations of resonant converters.

BACKGROUND

Resonant converters may convert an input voltage to an output voltage. When driving a resonant load with a half-bridge driver circuit, resonant converters may use zero-voltage switching (ZVS) to reduce switching loss in the power switches, which, in turn, may improve their efficiency. In addition, ZVS may ensure relatively smooth alternating current (AC) currents and voltages and may provide a continuous uninterrupted inductor current. On the other hand, if non ZVS occurs while driving a load with a resonant output stage, high current spikes may appear in the power switches, which may exceed the maximum current rating of the power switches and/or may result in power losses in the power switches.

SUMMARY

According to an implementation, a resonant converter for detecting non-zero voltage switching includes an oscillator configured to generate a first clock signal to drive a first power switch, and a second clock signal to drive a second power switch. Each of the first clock signal and the second clock signal is activated during a switching cycle. The resonant converter includes a non-zero voltage switching (non-ZVS) detection circuit configured to receive an integrated current sense signal sensed on a primary side of a transformer of a resonant network, and determine a polarity of a voltage of the integrated current sense signal at a predetermined point in the first clock signal or the second clock signal during the switching cycle. The non-ZVS detection circuit is configured to detect a non-ZVS event based on the polarity of the voltage of the integrated current sense signal at the predetermined point in the first clock signal or the second clock signal during the switching cycle.

The details of one or more implementations are set forth in the accompanying drawings and the description below. Other features will be apparent from the description and drawings, and from the claims.

DETAILED DESCRIPTION

Figure 1A:
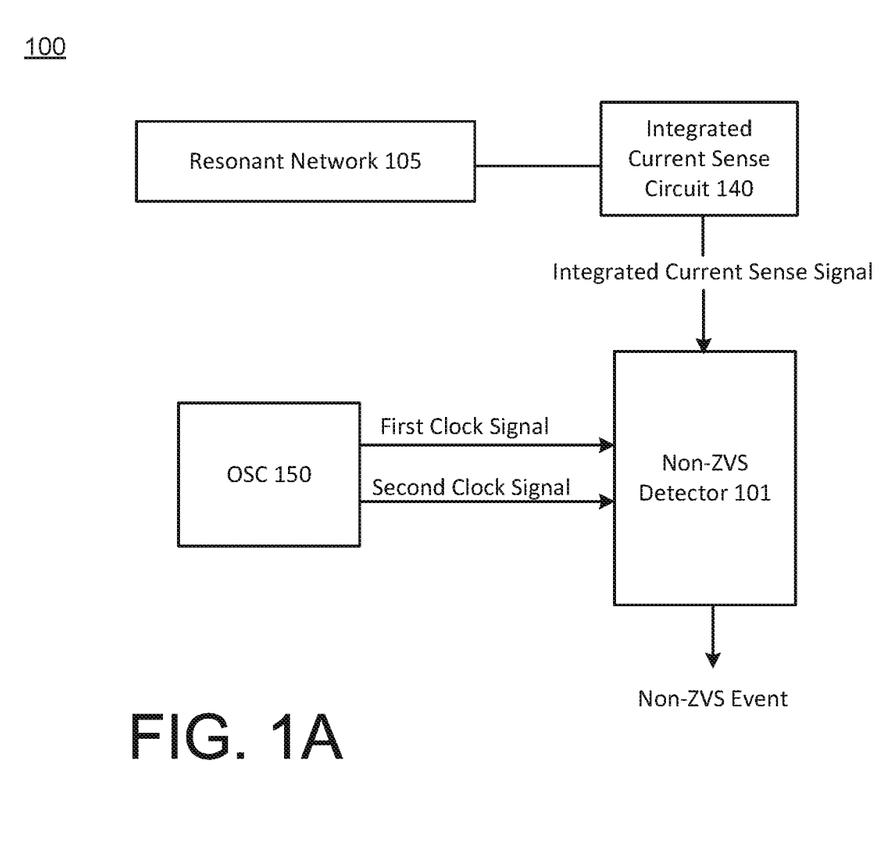
FIG. 1A illustrates a resonant converter for detecting a non-zero voltage switching event according to an implementation.

FIG. 1A illustrates a resonant converter 100 for detecting a non-zero voltage switching (non-ZVS) event according to an implementation. In some examples, the resonant converter 100 may be an electric power converter that includes a network of one or more inductors and one or more capacitors, which are tuned to resonate at one or more frequencies, and convert an input voltage to an output voltage based on resonant current oscillation.

The resonant converter 100 includes an oscillator 150 configured to generate a first clock signal to drive a first power switch, and a second clock signal to drive a second power switch, where each of the first clock signal and the second clock signal is activated during a switching cycle. The resonant converter 100 includes a non-ZVS detector 101 configured to detect a non-ZVS event during a switching operation of the resonant converter 100. For example, the non-ZVS detector 101 may receive an integrated current sense signal sensed by an integrated current sense circuit 140 on a resonant network 105. The resonant network 105 may include a resonant capacitor, a resonant inductor, and a magnetizing inductor disposed on a primary side of a transformer of the resonant converter 100. The integrated current sense circuit 140 may be configured to sense the integrated current sense signal by sensing the voltage of the resonant capacitor using a capacitance divider. The non-ZVS detector 101 may determine a polarity of the voltage of the integrated current sense signal at a predetermined point (e.g., half-way point) in the first clock signal or the second clock signal during the switching cycle, and detect a non-ZVS event based on the polarity of the voltage of the integrated current sense signal at the predetermined point in the first clock signal or the second clock signal during the switching cycle.

In some examples, the non-ZVS detector 101 may determine a polarity of the voltage of the integrated current sense signal at a predetermined point in the second clock signal, and, in response to the polarity being negative, the non-ZVS detector 101 may detect the non-ZVS event. In some examples, the non-ZVS detector 101 may receive the first clock signal and sense a predetermined point (e.g., half-way point) in the first clock signal during a particular switching cycle. The non-ZVS detector 101 may calculate a predetermined point (e.g., half-way point) in the second clock signal. Then, the non-ZVS detector 101 may determine the polarity of the voltage of the integrated current sense signal at the predetermined point in the second clock signal, and, in response to the polarity being negative, the non-ZVS detector 101 may detect the non-ZVS event.

In some examples, the non-ZVS detector 101 determines a polarity of the voltage of the integrated current sense signal at a predetermined point in the first clock signal during a first switching cycle, and, in response to the polarity being positive during a second switching cycle, the non-ZVS detector 101 may detect a non-ZVS event in the subsequent second switching cycle. In some examples, upon detection of the non-ZVS event, the non-ZVS detector 101 is configured to trigger a protection mechanism to increase the operating frequency or stop the switching operation of the oscillator 150.

Resonant converters having the non-ZVS detector 101 can be advantageous over existing non-ZVS detection solutions because the non-ZVS detector 101 can be implemented with relatively fewer and less costly parts, and without direct a current sensing circuit and dedicated pin of an integrated circuit (IC). In some examples, conventional resonant converters may use secondary side Inductor-Inductor-Capacitor (LLC) control, which may use one or more current sense transformers. However, current sense transformers may be relatively expensive, since they are required to withstand a relatively high isolation voltage. Furthermore, additional over voltage protection may be required on the output side because, in some examples, the resonant converter is current controlled using only the current sense transformer. In some examples, overvoltage protection may be provided by an opto-coupler and a Zener diode, and/or a crowbar system. In addition, the LLC resonant converter control circuit may need a direct current sensing circuit and a dedicated pin of the IC. However, in combination with the current sense transformer, these over voltage protection components may increase the cost of the overall system.

Figure 1B:
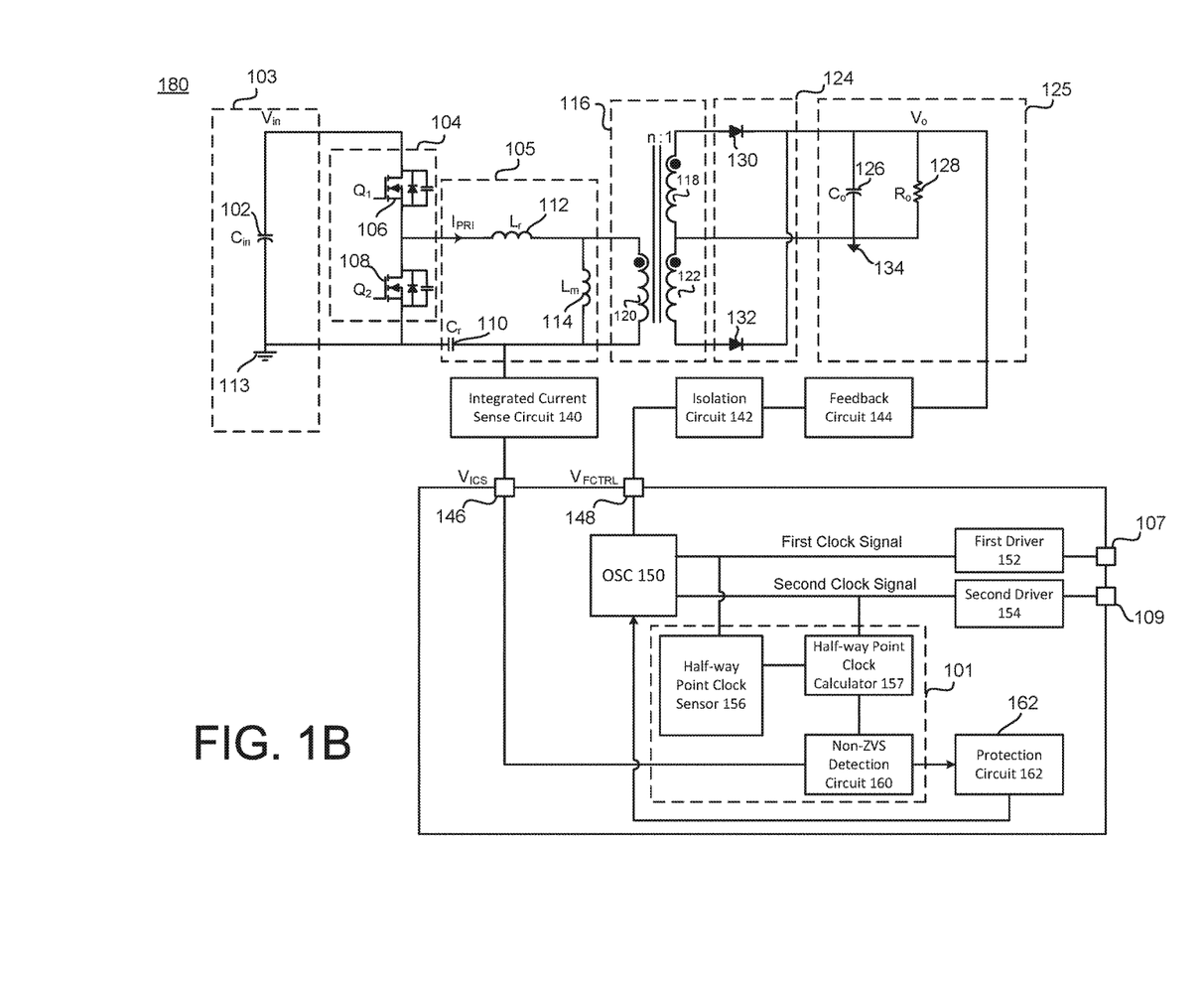
FIG. 1B illustrates a resonant converter for detecting a non-zero voltage switching event according to another implementation.

FIG. 1B illustrates an example embodiment of a resonant converter 180 for detecting a non-zero switching event according to an implementation. In some examples, the resonant converter 180 may be an electric power converter that includes a network of one or more inductors and one or more capacitors, which are tuned to resonate at one or more frequencies, and convert an input voltage ($V_{in}$) to an output voltage ($V_o$) based on resonant current oscillation.

In some examples, the resonant converter 180 may be a direct current (DC) to DC converter. In some examples, the resonant converter 180 may be a Zero Voltage Switching (ZVS) resonant converter, which turns on at zero voltage, and the output voltage can be controlled by varying the frequency of the switching. In some examples, the resonant converter 180 can be used in a variety of different applications such as Advanced Technology eXtended (ATX) power, server power, audio systems, lighting, game console, computing devices, low to high power applications, and/or soft switching to high frequency switching.

In some examples, the resonant converter 180 is incorporated into an integrated circuit (IC) having a plurality of pins (e.g., a 16 pin or 20 pin arrangement). As shown in FIG. 1B, the pins may include an integrated current sense access pin 146 for access to the integrated current sense signal, a frequency-controlled voltage signal access pin 148 for access to the frequency-controlled voltage signal (VFCTRL), a first gate access pin 107 for access to the gate of a first power switch 106, a second gate access pin 109 for access to the gate of a second power switch 108. In some examples, the IC having the resonant converter 180 may include other pins such as a ground pin, a power supply pin, line voltage sensing, voltage switching node pin, etc. In some examples, the resonant converter 180 may have other components and circuits such as a resonant capacitor stabilizer as disclosed in U.S. patent application Ser. No. 15/668,975, filed on Aug. 4, 2017, integrated current sense short protection as disclosed in U.S. patent application Ser. No. 15/668,980, filed on Aug. 4, 2017, and/or advanced burst mode control with power estimation as disclosed in U.S. patent application Ser. No. 15/668,983, filed on Aug. 4, 2017, each of which is incorporated by reference in its entirety.

The resonant converter 180 may include an input capacitance circuit 103, a bridge circuit 104, the resonant network 105, a transformer 116, a rectification circuit 124, and an output capacitance circuit 125. Also, the resonant converter 180 may include a feedback circuit 144, an isolation circuit 142, a voltage controlled oscillator 150 (controlled by a frequency-controlled signal ($V_{FCTRL}$)), a first driver 152, and a second driver 154.

The input capacitance circuit 103 may receive an input voltage ($V_{in}$). The input capacitance circuit 103 may include an input capacitor ($C_{in}$) 102 and a ground 113. In some examples, the input capacitor 102 may be a polarized capacitor having a negative terminal and a positive terminal. The negative terminal of the input capacitor 102 may be coupled to the ground 113. In some examples, the input capacitance circuit 103 may be considered a circuit separate from the bridge circuit 104. In some examples, the input capacitance circuit 103 may be considered as part of the bridge circuit 104.

Figure 2:
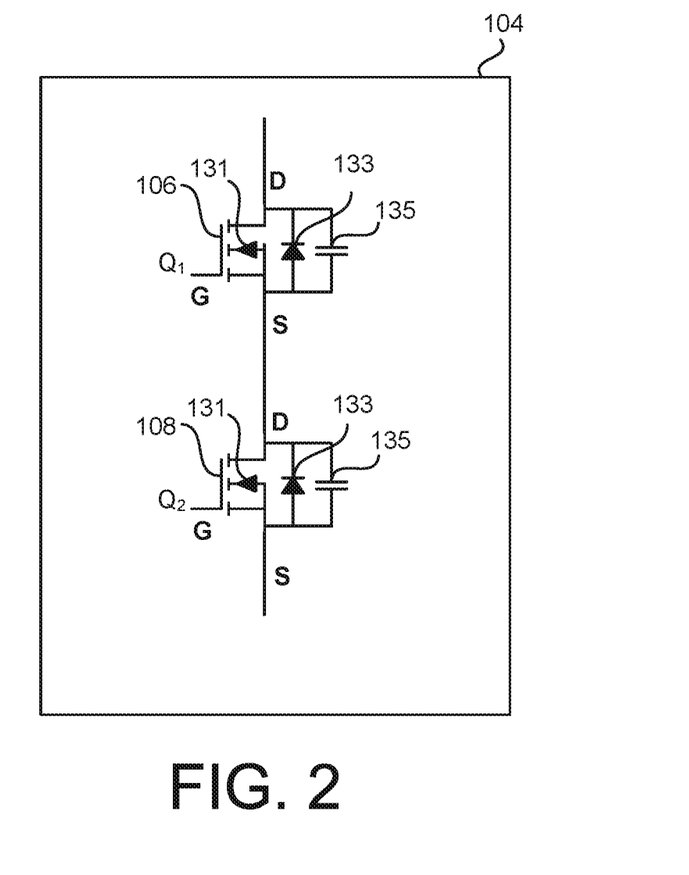
FIG. 2 illustrates an example of a bridge circuit of the resonant converter according to an implementation.

As shown in FIG. 1B, the bridge circuit 104 may be a half-bridge circuit. For example, the bridge circuit 104 may include a pair of power switches including a first power switch 106 and a second power switch 108. In some examples, the first power switch 106 and the second power switch 108 are Metal Oxide Semiconductor Field Effect Transistors (MOSFET) power switches. In some examples, the bridge circuit 104 is a full-bridge circuit having two or more pairs of MOSFET switches. FIG. 2 illustrates an example of the bridge circuit 104 having the first power switch 106 and the second power switch 108 according to an implementation. In some examples, the first power switch 106 and the second power switch 108 may be an N-type MOSFETs. Referring to FIG. 2, each of the first power switch 106 and the second power switch 108 includes a gate (G), a source (S), and a drain (D). Also, each of the first power switch 106 and the second power switch 108 includes an intrinsic body diode 131, an anti-diode 133, and a parasitic output capacitor 135.

Referring back to FIG. 1B, the bridge circuit 104 may generate a square wave voltage by alternatively driving the first power switch 106 and the second power switch 108. In some examples, the bridge circuit 104 is alternatively driven with a 50% duty cycle for each switch. Based on the voltage-controlled signal ($V_{FCTRL}$), the voltage controlled oscillator 150 generates a first clock signal to control the first driver 152, and a second clock signal to control the second driver 154. The first driver 152 is connected to the gate of the first power switch 106, and the second driver 154 is connected to the gate of the second power switch 108.

The first driver 152 and the second driver 154 may switch the first power switch 106 and the second power switch 108, respectively, on and off in phase opposition symmetrically, that is, for exactly the same time. This is commonly referred to as 50% duty cycle operation even if the conduction time of either power switch 106, 108 is slightly shorter than 50% of the switching period. In other words, the first power switch 106 and the second power switch 108 may operate under the condition of equal pulse width. In some examples, a dead time (e.g., a small dead time) is inserted between the turn-off of either power switch 106, 108 and the turn-on of the complementary one. This may ensure that the first power switch 106 and the second power switch 108 will not cross-conduct (or substantially not cross-conduct).

Based on the switching of the first power switch 106 and the second power switch 108, the bridge circuit 104 generates a square waveform, which excites the resonant network 105. The resonant network 105 filters the higher harmonic currents of the square waveform generated by the bridge circuit 104. Essentially, only sinusoidal current is allowed to flow through the resonant network 105 even though a square wave voltage is applied to the resonant network 105. As such, the resonant network 105 generates and outputs a resonant sinusoidal waveform that is scaled by the transformer 116 and rectified by the rectification circuit 124, and the output capacitance circuit 125 filters the rectified current and outputs a DC output voltage ($V_o$). The output voltage ($V_o$) may be adjusted by changing the operational frequency of the first power switch 106 and the second power switch 108.

In some examples, the resonant network 105 includes at least three reactive elements. In some examples, the resonant converter 180 is an LLC resonant converter. For example, the resonant network 105 may include a resonant capacitor ($C_r$) 110, a resonant inductor ($L_r$) 112, and a magnetizing inductor ($L_m$) 114. The magnetizing inductor 114 is configured to operate as a shunt inductor. The current lags the voltage applied to the resonant network 105, which allows the first power switch 106 and the second power switch 108 to be turned on with zero voltage. The transformer 116 includes a primary side winding 120 and one or more secondary side windings such as a first secondary side winding 118 and a second secondary side winding 122. The first secondary side winding 118 and the second secondary side winding 122 are coupled in series. In some examples, the secondary side winding includes only one winding (e.g., either first secondary side winding 118 or second secondary side winding 122). In some examples, the transformer 116 includes multiple windings on the primary side and multiple windings on the secondary side.

The rectification circuit 124 may produce a DC voltage by rectifying AC current. For example, the rectification circuit 124 may rectify the AC current with rectifier diodes such as a first rectification diode 130, and a second rectification diode 132. In some examples, the rectification circuit 124 includes only one rectification diode (e.g., either the first rectification diode 130 or the second rectification diode 132). In some examples, the rectification circuit 124 includes more than two rectification diodes. The anode of the first rectification diode 130 is connected to the positive terminal of the first secondary side winding 118, and the anode of the second rectification diode 132 is connected to the negative terminal of the second secondary side winding 122.

The output capacitance circuit 125 may filter the rectified current and output the DC output voltage ($V_o$). The output capacitance circuit 125 may include an output capacitor ($C_o$) 126, and an output resistor ($R_o$) 128. In some examples, the output capacitor 126 is connected in parallel to the output resistor 128. In some examples, the output capacitance circuit 125 may be considered a circuit separate from the rectification circuit 124. In some examples, the output capacitance circuit 125 may be considered as part of the rectification circuit 124.

The first rectification diode 130 and the second rectification diode 132 are connected to the output capacitor 126. For example, the cathode of the first rectification diode 130 is connected to the positive terminal of the output capacitor 126, and the cathode of the second rectification diode 132 is also connected to the positive terminal of the output capacitor 126. The negative terminal of the output capacitor 126 is connected to a ground 134.

The feedback circuit 144 may be configured to regulate the switching frequency of the resonant converter 180 with a voltage feedback loop by sensing the output voltage. The feedback circuit 144 may be connected to the output capacitance circuit 125 and/or the rectification circuit 124. The isolation circuit 142 is provided on the voltage feedback loop in order to provide isolation required by safety regulations. The isolation circuit 142 may receive a signal from the feedback circuit 144, and then generate the frequency-controlled voltage signal $V_{FCTRL}$ which is supplied to the oscillator 150.

Figure 3:
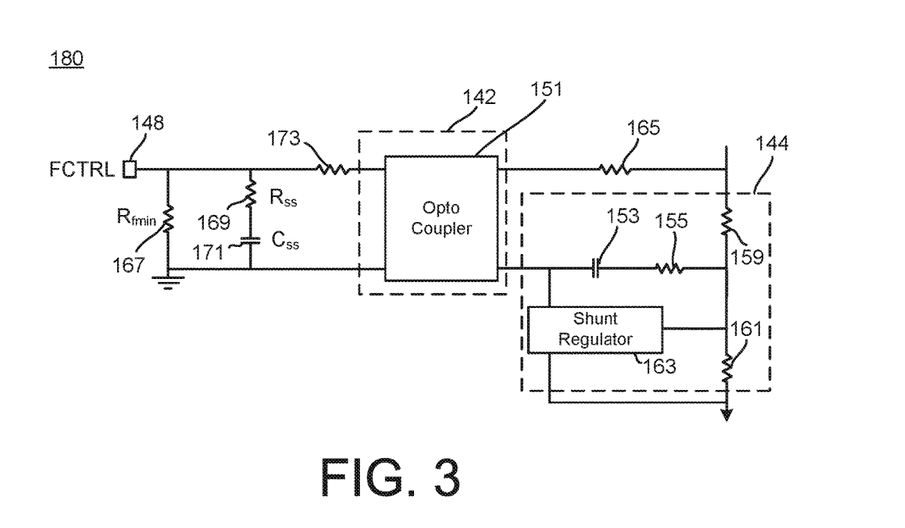
FIG. 3 illustrates an example of a feedback circuit and an isolation circuit of the resonant converter according to an implementation.

FIG. 3 illustrates an example of the feedback circuit 144 and the isolation circuit 142 according to an implementation. In some examples, the feedback circuit 144 may include a shunt regulator 163. In some examples, the feedback circuit 144 may also include one or more compensation resistors and one or more compensation capacitors. For example, the feedback circuit 144 may include a capacitor 153, a resistor 155, a resistor 159, and a resistor 161. The isolation circuit 142 may include an opto-coupler 151. The opto-coupler 151 may be coupled to the feedback circuit 144 and the voltage-controlled signal access pin 148. Also, in some examples, the resonant converter 180 may include a resistor ($R_{fmin}$) 167, a resistor ($R_{ss}$) 169, a capacitor ($C_{ss}$) 171, a resistor 173, and a resister 165. The resistor 167 may be coupled to the voltage-controlled signal access pin 148, and the resistor 167 may be in parallel with the resistor 169 and the capacitor 171. The resistor 173 may be disposed between the opto-coupler 151 and the voltage-controlled signal access pin 148.

Referring back to FIG. 1B, the current $I_{PRI}$ (through the resonant inductor 112) lags the voltage applied to the resonant network 105, which allows the first power switch 106 and the second power switch 108 to be turned on with zero voltage. Referring to FIGS. 1 and 2, the first power switch 106 turns on while the voltage across the first power switch 106 is zero by flowing current through the anti-diode 133 of the first power switch 106. The parasitic output capacitor 135 of the first power switch 106 is discharged before the first power switch 106 is turned on. Similarly, the second power switch 108 turns on while the voltage across the second power switch 108 is zero by flowing current through the anti-diode 133 of second power switch 108. The parasitic output capacitor 135 of the second power switch 108 is discharged before the second power switch 108 is turned on. However, if the operating frequency is below the resonant frequency of the resonant network 105, a non-ZVS operation may occur. In other words, if the operating frequency decreases by a relatively large amount, the resonant converter 180 may operate in a non-ZVS region. Should non zero-voltage switching occur while driving a load with a resonant output stage, high current spikes may appear in the first power switch 106 and the second power switch 108, which can exceed the maximum current rating of the switches and/or resulting power losses in the switches can cause the switches to thermally destruct.

However, according to the embodiments, the resonant converter 180 includes the non-ZVS detector 101 configured to detect a non-ZVS event and trigger a protection circuit 162 to increase the operating frequency or stop the switching operation to avoid (or reduce) the high current spikes that otherwise might occur during a non-ZVS event. In some examples, the non-ZVS detector 101 includes a non-ZVS detection circuit, a half-way point clock sensor 156, and a half-way point clock calculator 157. Upon detection of the non-ZVS event, the non-ZVS detection circuit 160 is configured to trigger the protection circuit 162 to increase the operating frequency of the resonant converter 180. In some examples, the non-ZVS detection circuit 160 is configured to detect the non-ZVS event based on an integrated current sense signal that is sensed on the primary side of the transformer.

Figure 4:
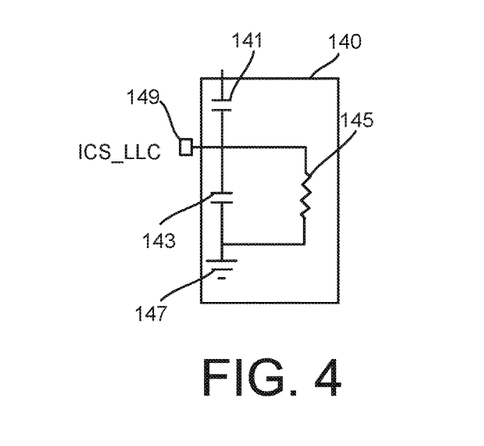
FIG. 4 illustrates an example of an integrated current sense circuit of the resonant converter according to an implementation.

FIG. 4 illustrates an example of the integrated current sense circuit 140 according to an implementation. The integrated current sense signal may be the integrated current of the primary side of the transformer 116. In some examples, the integrated current sense circuit 140 senses the integrated current sense signal by a capacitor divider from the voltage of the resonance capacitor 110. The integrated current sense circuit 140 may include a first capacitor 141 and a second capacitor 143. The first capacitor 141 and the second capacitor 143 are configured as a capacitor divider from the voltage of the resonance capacitor 110. The first capacitor 141 may be in series with the second capacitor 143. The integrated current sense circuit 140 may include a resistor 145 in parallel with the second capacitor 143. In some examples, the resonant converter 180 may include an integrated current access pin 149 coupled to a point between the first capacitor 141 and the second capacitor, which may receive the integrated current sense signal. The voltage ($V_{ICS}$) of the integrated current sense signal may have a relation with the current ($I_{PRI}$) flowing through the resonance inductor 112. For example, $V_{ICS}$=k*(integral ($I_{PRI}$))– bias voltage. The ratio of the first capacitor 141 and the second capacitor 143 may determine the constant k, and the resistor 145 may remove the voltage offset (or voltage bias) of the voltage of the capacitor divider.

In some examples, with respect to a single switching cycle (in which the first power switch 106 is ON approximately half the switching cycle, and the second power switch 108 is ON approximately the other half of the switching cycle), the non-ZVS detection circuit 160 receives the integrated current sense signal (from the integrated current sense circuit 140 or the integrated current sense access pin 149), and determines a polarity of the voltage ($V_{ICS}$) of the integrated current sense signal at a predetermined point in the second clock signal that is used to drive the second power switch 108.

In some examples, the predetermined point is the half-way point in the second clock signal. For example, if the second clock signal is activated during a switching cycle starting at 5 milliseconds and is deactivated at 6 milliseconds (i.e., the duration of the second clock signal being 1 milliseconds), the half-way point is 5.5 milliseconds (or 0.5 milliseconds within the context of the duration of the second clock signal). In some examples, the predetermined point is a point other than the half-way point in the second clock signal. For example, the predetermined point may be a point that is less than the half-way point of the second clock signal, or may be a point that is greater than the half-way point of the second clock signal.

In some examples, in response to the polarity of the voltage ($V_{ICS}$) of the integrated current sense signal being negative at the predetermined point in the second clock signal, the non-ZVS detection circuit 160 is configured to detect the non-ZVS event during the switching cycle. In response to the detection of the non-ZVS event, the non-ZVS detection circuit 160 is configured to trigger the protection circuit 162 to increase the operating frequency or stop the switching operation to avoid (or reduce) the high current spikes that otherwise might occur during a non-ZVS event. For example, the non-ZVS detection circuit 160 is configured to send a protection control signal to the protection circuit 162 in response to the detection of the non-ZVS event. In response to the received protection control signal, the protection circuit 162 is configured to send a frequency increase signal to the oscillation 150 to increase the operating frequency or stop the switching operation. However, in response to the polarity of the voltage ($V_{ICS}$) of the integrated current sense signal being positive at the predetermined point in the second clock signal, the non-ZVS detection circuit 160 is configured to detect a ZVS event during the switching cycle. When the ZVS event is detected, the non-ZVS detection circuit 160 is configured to not invoke or trigger the protection circuit 162.

Figure 5:
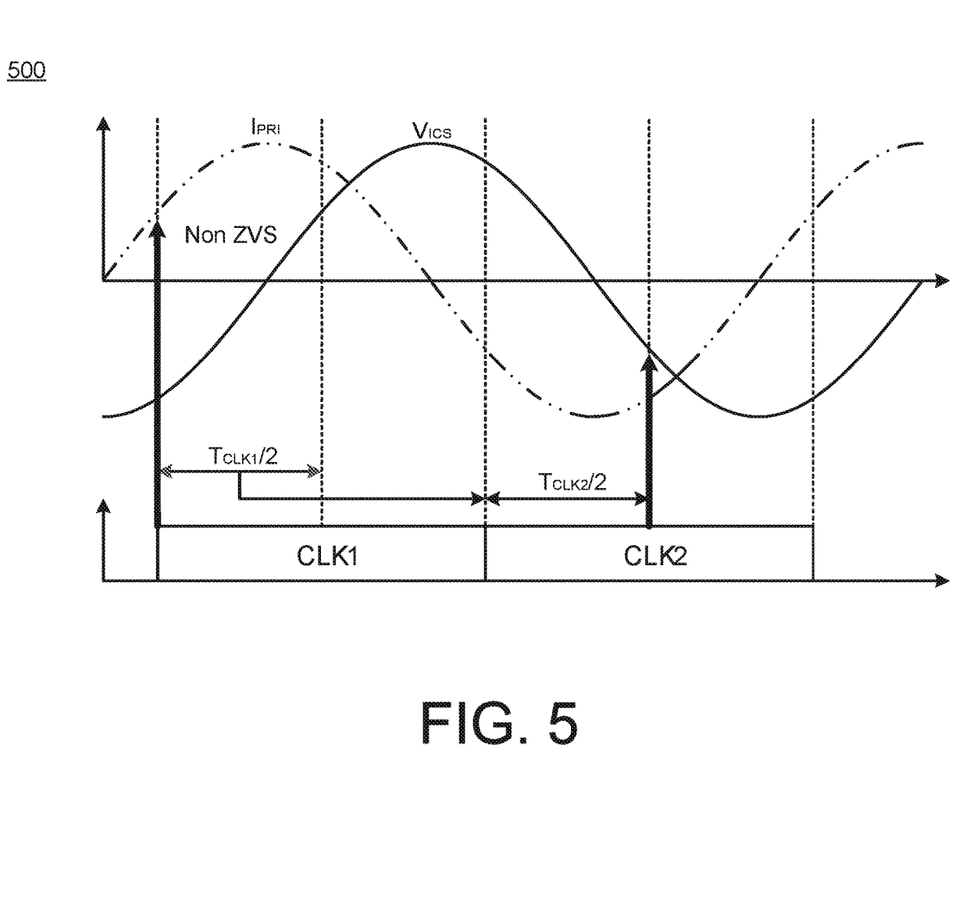
FIG. 5 illustrates a waveform diagram depicting current $I_{PRI}$ and voltage $V_{ICS}$ of the resonant converter during a non-zero voltage switching event according to an implementation.

FIG. 5 illustrates a waveform diagram 500 depicting the current $I_{PRI}$ and the voltage $V_{ICS}$ within a switching cycle during a non-ZVS event according to an implementation. As shown in FIG. 5, if $V_{ICS}$ is a negative value at half of $T_{CLK2}$, a non-ZVS event is detected. The current $I_{PRI}$ starts with a positive value which induces hard switching of the second power switch 108 (e.g., the high side MOSFET). As a result, the voltage $V_{ICS}$ may always have a negative value at $T_{CLK2/2}$.

Figure 6:
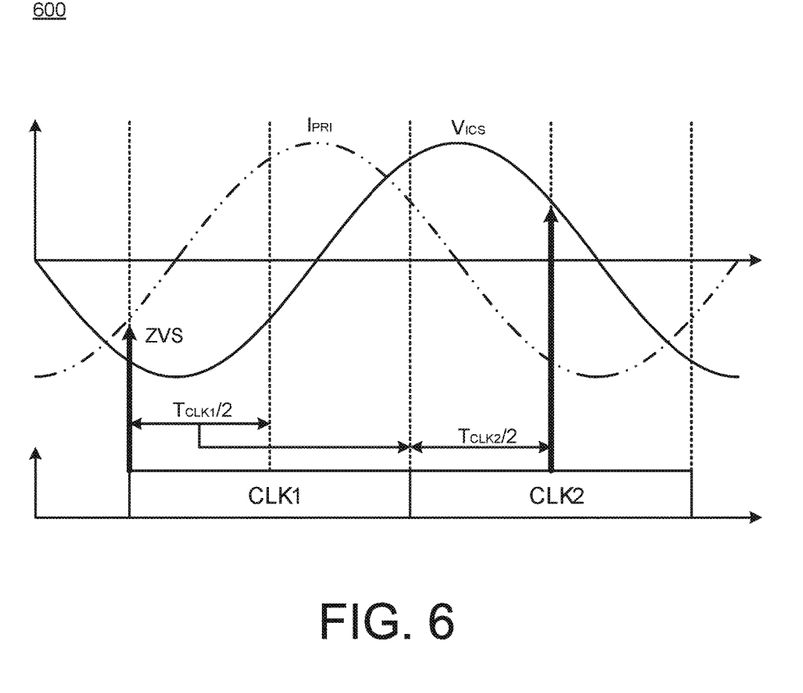
FIG. 6 illustrates a waveform diagram depicting the current $I_{PRI}$ and the voltage $V_{ICS}$ of the resonant converter during a zero voltage switching event according to an implementation.

FIG. 6 illustrates a waveform diagram 600 depicting the current $I_{PRI}$ and the voltage $V_{ICS}$ within a switching cycle during a ZVS event according to an implementation. As shown in FIG. 6, if $V_{ICS}$ is positive at half of $T_{CLK2}$, a ZVS event is detected. As shown in FIG. 6, the current $I_{PRI}$ starts with a negative value, which discharges the parasitic output capacitor 135 at around rising edge of the first clock signal. The voltage ($V_{ICS}$) of the integrated current sense signal is lagged by 90 degree because it is sensed from the resonant capacitor 110. Therefore, the voltage ($V_{ICS}$) of the integrated current sense signal should have a positive value at $T_{CLK2/2}$ under a normal ZVS event.

Referring back to FIG. 1B, in some examples, the half-way point clock sensor 156 is configured to receive the first clock signal and sense a half-way point in the first clock signal during the switching cycle, and the half-way point clock calculator 157 is configured to receive the second clock signal and the sensed half-way point of the first clock signal, and calculate a half-way point in the second clock signal during the switching cycle based on the second clock signal and the sensed half-way point of the first clock signal. For example, the half-way point clock calculator 157 may measure the time for the first clock, and divide the time by 2 just after the falling edge of the first clock to obtain ($T_{CLK1/2}$). Then, the half-way point clock calculator 157 may start a counter at the rising of the second clock. When the counter becomes the time as indicated by $T_{CLK1/2}$, the half-way point clock calculator 157 triggers the half-way point signal (e.g., $T_{CLK2/2}$). The non-ZVS detection circuit 160 is configured to receive the calculated half-way point (e.g., $T_{CLK/2}$) in the second clock signal and the voltage ($V_{ICS}$) from the integrated current sense circuit 140 (or the integrated current sense access pin 146). The non-ZVS detection circuit 160 is configured to determine a polarity of the voltage ($V_{ICS}$) of the integrated current sense signal from the half-way point in the second clock signal during the switching cycle. In response to the polarity being negative, the non-ZVS detection circuit 160 is configured to detect the non-ZVS event during the switching cycle. In response to the polarity being position, the non-ZVS detection circuit 160 is configured to detect a ZVS event during the switching cycle.

Figure 7:
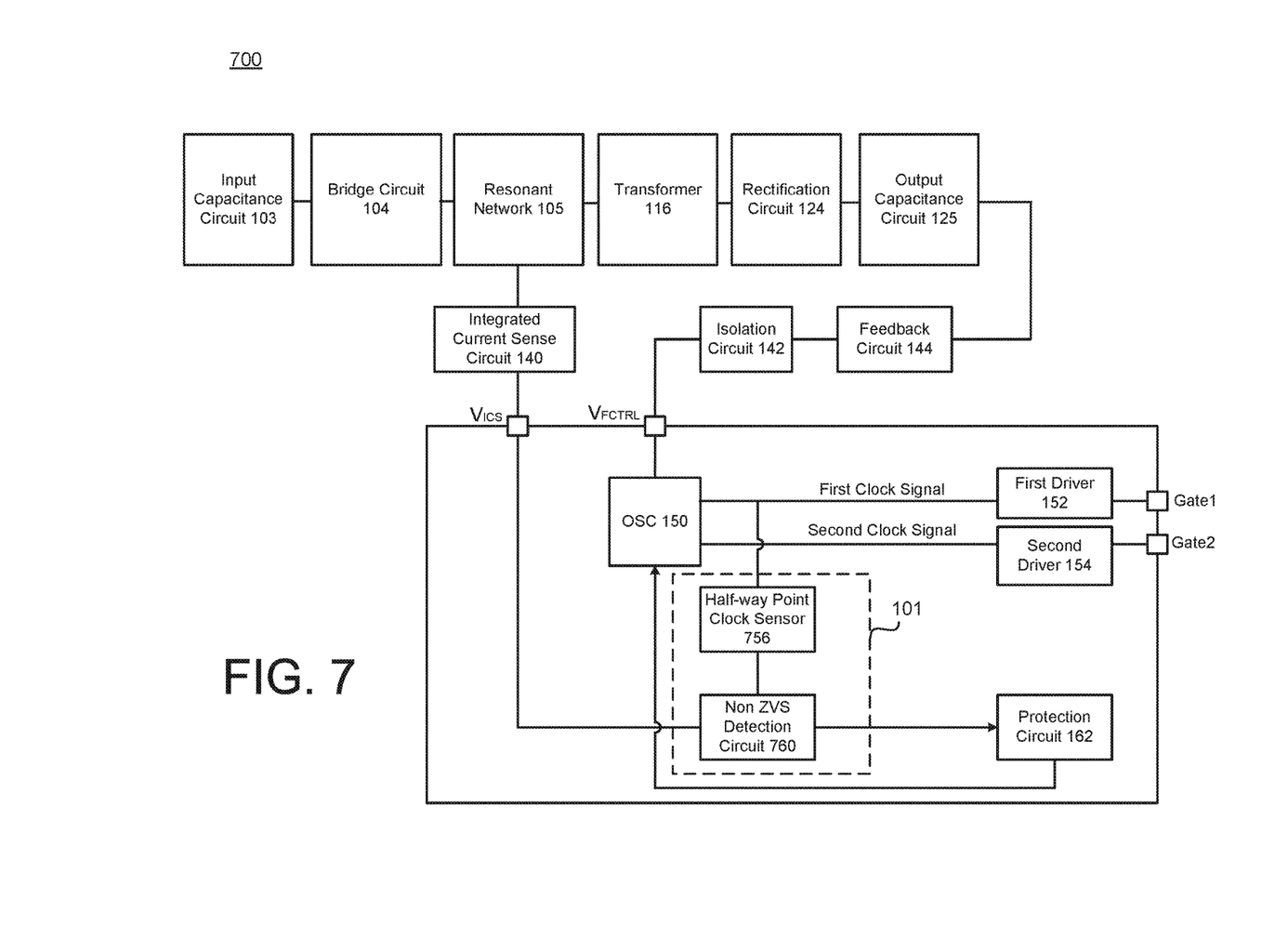
FIG. 7 illustrates a resonant converter for detecting a non-zero voltage switching event according to another implementation.

FIG. 7 illustrates a resonant converter 700 for detecting a non-ZVS event according to another implementation. The resonant converter 700 may include the non-ZVS detector 101. In some examples, the non-ZVS detector 101 of FIG. 7 includes a half-way point clock sensor 756, and a non-ZVS detection circuit 760. Instead of determining the polarity of the voltage ($V_{ICS}$) of the integrated current sense signal at the predetermined point of the second clock signal, the non-ZVS detection circuit 760 is configured to determine a polarity of the voltage ($V_{ICS}$) of the integrated current sense signal at a predetermined point in the first clock signal during a first switching cycle, and use this information to determine whether there is a non-ZVS event in a subsequent second switching cycle.

The resonant converter 700 may include the input capacitance circuit 103, the bridge circuit 104, the resonant network 105, the transformer 116, the rectification circuit 124, the output capacitance circuit 125, the integrated current sense circuit 140, the isolation circuit 142, the feedback circuit 144, the oscillator 150, the first driver 152, the second driver 154, and the protection circuit 162. The details of these components were previously described with reference to FIGS. 1-4.

The non-ZVS detection circuit 760 is configured to receive the voltage ($V_{ICS}$) of the integrated current sense signal, and detect a polarity of the voltage ($V_{ICS}$) of the integrated current sense signal at a predetermined point of the first clock signal during a first switching cycle (or (n–1) switching cycle). In response to the polarity being positive, the non-ZVS detection circuit 760 is configured detect a non-ZVS event in a second switching cycle (or n switching cycle). For example, in response to the detection of the non-ZVS event, the non-ZVS detection circuit 760 is configured to trigger the protection circuit 162 to increase the operating frequency or stop the switching operation of the oscillator 150 to avoid (or reduce) the high current spikes that otherwise might occur during a non-ZVS event. For example, the non-ZVS detection circuit 760 is configured to send a protection control signal to the protection circuit 162 in response to the detection of the non-ZVS event. In response to the received protection control signal, the protection circuit 162 is configured to send a frequency increase signal to the oscillation 150 to increase the operating frequency or stop the switching operation of the oscillation 150. In some examples, the protection circuit 162 is configured to increase the operating frequency or stop the switching operation in the subsequent third switching cycle. However, in response to the polarity of the voltage ($V_{ICS}$) of the integrated current sense signal being negative at the predetermined point in the first clock signal, the non-ZVS detection circuit 760 is configured to detect a ZVS event during the second switching cycle. When the ZVS event is detected, the non-ZVS detection circuit 760 is configured to not invoke or trigger the protection circuit 162.

In some examples, the predetermined point is the half-way point in the first clock signal. For example, if the first clock signal is activated during a switching cycle starting at 5 milliseconds and is deactivated at 6 milliseconds (i.e., the duration of the first clock signal being 1 milliseconds), the half-way point is 5.5 milliseconds (or 0.5 milliseconds within the context of the duration of the first clock signal). In some examples, the predetermined point is a point other than the half-way point in the first clock signal. For example, the predetermined point may be a point that is less than the half-way point of the first clock signal, or may be a point that is greater than the half-way point of the first clock signal.

Figure 8:
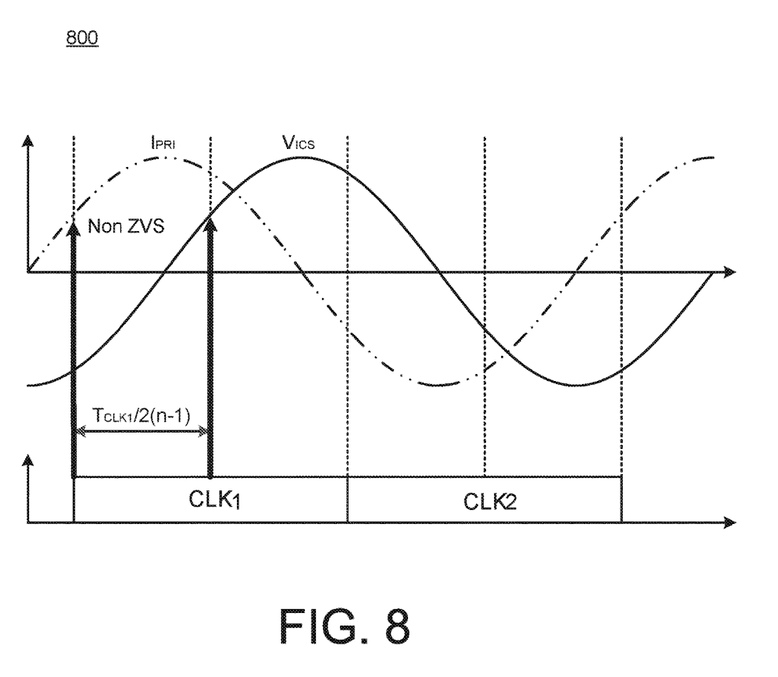
FIG. 8 illustrates a waveform diagram depicting current $I_{PRI}$ and voltage $V_{ICS}$ of the resonant converter of FIG. 7 during a non-zero voltage switching event according to an implementation.

FIG. 8 illustrates a waveform diagram 800 depicting the current $I_{PRI}$ and the voltage $V_{ICS}$ within a first switching cycle causing a non-ZVS event according to an implementation. As shown in FIG. 8, if $V_{ICS}$ is a positive value at half of $T_{CLK1\ (n-1)}$, a non-ZVS event is detected.

Figure 9:
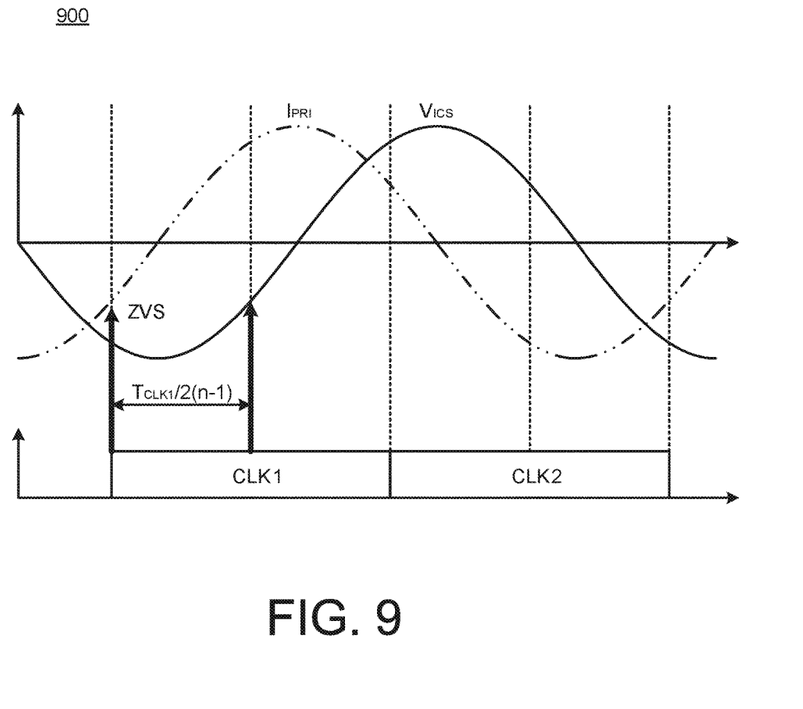
FIG. 9 illustrates a waveform diagram depicting the current $I_{PRI}$ and the voltage $V_{ICS}$ of the resonant converter of FIG. 7 during a zero voltage switching event according to an implementation.

FIG. 9 illustrates a waveform diagram 900 depicting the current $I_{PRI}$ and the voltage $V_{ICS}$ within a first switching cycle during a ZVS event according to an implementation. As shown in FIG. 9, if $V_{ICS}$ is negative at half of $T_{CLK1(n-1)}$, a ZVS event is detected.

Referring back to FIG. 7, in some examples, the half-way point clock sensor 756 is configured to receive the first clock signal during the first switching cycle, and sense a half-way point in the first clock signal during the first switching cycle. Then, the non-ZVS detection circuit 760 is configured to determine the polarity of the voltage ($V_{ICS}$) of the integrated current sense signal at the half-way point in the first clock signal during the second switching cycle using the integrated current sense signal and the half-way point of the first clock signal during the first switching cycle. If the polarity is positive, the non-ZVS detection circuit 760 may determine a non-ZVS event and trigger the protection circuit 162 to increase the operating frequency of the oscillator 150 or stop the switching operation of the oscillator 150. However, if the polarity is negative, the non-ZVS detection circuit 760 may detect a ZVS event, and not trigger the protection circuit 162.

According to an implementation, a resonant converter for detecting non-zero voltage switching includes an oscillator configured to generate a first clock signal to drive a first power switch, and a second clock signal to drive a second power switch. Each of the first clock signal and the second clock signal is activated during a switching cycle. The resonant converter includes a non-zero voltage switching (non-ZVS) detection circuit configured to receive an integrated current sense signal sensed on a primary side of a transformer of a resonant network, and determine a polarity of a voltage of the integrated current sense signal at a predetermined point in the first clock signal or the second clock signal during the switching cycle. The non-ZVS detection circuit is configured to detect a non-ZVS event based on the polarity of the voltage of the integrated current sense signal at the predetermined point in the first clock signal or the second clock signal during the switching cycle.

According to some implementations, the resonant converter may include one or more of the following features (or any combination thereof). The predetermined point in the first clock signal or the second clock signal may be a halfway point in the first clock signal or the second clock signal. The non-ZVS detection circuit may be configured to detect the non-ZVS event in response to the voltage of the integrated current sense signal being negative at the predetermined point in the second clock signal. The non-ZVS detection circuit may be configured to detect the non-ZVS event in response to the voltage of the integrated current sense signal being positive at the predetermined point in the first clock signal. The resonant converter may include a half-way point clock sensor configured to receive the first clock signal and sense a half-way point in the first clock signal during the switching cycle, and a half-way point clock calculator configured to calculate a half-way point in the second clock signal during the switching cycle based on the sensed half-way point of the first clock signal. The non-ZVS detection circuit may be configured to determine the polarity of the voltage of the integrated current sense signal at the half-way point in the second clock signal during the switching cycle using the integrated current sense signal and the calculated half-way point of the second clock signal. In response to the polarity being negative, the non-ZVS detection circuit may be configured to determine the non-ZVS event during the switching cycle. In response to the detection of the non-ZVS event, the non-ZVS detection circuit may be configured to trigger a protection circuit to increase a frequency or stop a switching operation of the oscillator. The switching cycle may be a first switching cycle, and the non-ZVS detection circuit may be configured to detect the non-ZVS event in a second switching cycle in response to the voltage of the integrated current sense signal during the second switching cycle being positive at the predetermined point in the first clock signal. The resonant converter may include a half-way point clock sensor configured to receive the first clock signal during the first switching cycle, and sense a half-way point in the first clock signal during the first switching cycle. The non-ZVS detection circuit may be configured to determine the polarity of the voltage of the integrated current sense signal at the half-way point in the first clock signal during the second switching cycle using the integrated current sense signal and the half-way point of the first clock signal during the first switching cycle. The non-ZVS detection circuit may be configured to determine the non-ZVS event during the second switching cycle based on the polarity being positive. The integrated current sense circuit may be coupled to the resonant network on the primary side of the transformer. The resonant network may include a resonant capacitor, a resonant inductor, and a magnetizing inductor, and the integrated current sense circuit may include a capacitor divider coupled to the resonant capacitor.

According to an implementation, a resonant converter for detecting non-zero voltage switching includes an oscillator configured to generate a first clock signal to drive a first power switch, and a second clock signal to drive a second power switch. Each of the first clock signal and the second clock signal is activated during a switching cycle. The resonant converter includes a non-zero voltage switching (non-ZVS) detection circuit configured to receive an integrated current sense signal sensed on a primary side of a transformer of a resonant network, and determine a polarity of a voltage of the integrated current sense signal at a predetermined point in the second clock signal. The non-ZVS detection circuit is configured to detect a non-ZVS event in response to the polarity of the voltage of the integrated current sense signal being negative at the predetermined point in the second clock signal.

According to some implementations, the resonant converter may include one or more of the above and/or below features (or any combination thereof). The predetermined point in the second clock signal may be a halfway point in the second clock signal during the switching cycle. The non-ZVS detection circuit may be configured to detect a ZVS event in response to the polarity of the voltage of the integrated current sense signal being positive at the predetermined point in the second clock signal. The resonant converter may include a half-way point clock sensor configured to receive the first clock signal and sense a half-way point in the first clock signal during the switching cycle, and a half-way point clock calculator configured to calculate a half-way point in the second clock signal during the switching cycle based on the sensed half-way point of the first clock signal. The non-ZVS detection circuit may be configured to determine the polarity of the voltage of the integrated current sense signal at the half-way point in the second clock signal during the switching cycle based on the integrated current sense signal and the calculated half-way point of the second clock signal. In response to the detection of the non-ZVS event, the non-ZVS detection circuit may be configured to trigger a protection circuit to increase a frequency or stop a switching operation of the oscillator. The resonant network may include a resonant capacitor, a resonant inductor, and a magnetizing inductor, and the integrated current sense circuit may include a capacitor divider coupled to the resonant capacitor.

According to an implementation, a resonant converter for detecting non-zero voltage switching includes an oscillator configured to generate a first clock signal to drive a first power switch, and a second clock signal to drive a second power switch, and a non-zero voltage switching (non-ZVS) detection circuit configured to receive an integrated current sense signal sensed on a primary side of a transformer of a resonant network, and determine a polarity of a voltage of the integrated current sense signal at a predetermined point in the first clock signal during a second switching cycle. The non-ZVS detection circuit is configured to detect a non-ZVS event during a second switching cycle in response to the polarity of the voltage of the integrated current sense signal being positive at the predetermined point in the first clock signal during the second switching cycle.

According to some implementations, the resonant converter may include one or more of the above and/or below features (or any combination thereof). The predetermined point in the first clock signal may be a halfway point in the first clock signal during the first switching cycle. The resonant converter may include a haft-way point clock sensor configured to receive the first clock signal during the first switching cycle, and sense a half-way point in the first clock signal during the first switching cycle. The non-ZVS detection circuit may be configured to detect the polarity of the voltage of the integrated current sense signal at the half-way point in the first clock signal during the second switching cycle using the integrated current sense signal and the half-way point of the first clock signal during the first switching cycle. The resonant network may include a resonant capacitor, a resonant inductor, and a magnetizing inductor, and the integrated current sense circuit may include a capacitor divider coupled to the resonant capacitor.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A resonant converter for detecting non-zero voltage switching, the resonant converter comprising:
an oscillator configured to generate a first clock signal to drive a first power switch, and a second clock signal to drive a second power switch, each of the first clock signal and the second clock signal being activated during a switching cycle; and
a non-zero voltage switching (non-ZVS) detection circuit configured to receive an integrated current sense signal sensed on a primary side of a transformer of a resonant network,
the non-ZVS detection circuit including a clock sensor configured to receive the first clock signal and sense a predetermined time point in the first clock signal, the predetermined time point being later than an activation time of the first clock signal and being before a deactivation time of the first clock signal,
the non-ZVS detection circuit configured to determine a polarity of a voltage of the integrated current sense signal using the sensed predetermined time point,
the non-ZVS detection circuit configured to detect a non-ZVS event based on the polarity of the voltage of the integrated current sense signal being negative or positive.

2. The resonant converter of claim 1, wherein the predetermined time point in the first clock signal is a halfway time point in the first clock signal.

3. The resonant converter of claim 1, wherein the non-ZVS detection circuit is configured to detect the non-ZVS event in response to the voltage of the integrated current sense signal being negative at the predetermined time point.

4. The resonant converter of claim 1, wherein the non-ZVS detection circuit is configured to detect the non-ZVS event in response to the voltage of the integrated current sense signal being positive at the predetermined time point.

5. The resonant converter of claim 1, wherein the clock sensor is configured to receive the first clock signal and sense a half-way time point in the first clock signal during the switching cycle, the resonant converter further comprising:
a half-way point clock calculator configured to calculate a half-way time point in the second clock signal during the switching cycle based on the sensed half-way time point of the first clock signal,
wherein the non-ZVS detection circuit is configured to determine the polarity of the voltage of the integrated current sense signal at the half-way time point in the second clock signal during the switching cycle using the integrated current sense signal and the calculated half-way time point of the second clock signal,
wherein, in response to the polarity being negative, the non-ZVS detection circuit is configured to determine the non-ZVS event during the switching cycle.

6. The resonant converter of claim 1, wherein, in response to the detection of the non-ZVS event, the non-ZVS detection circuit is configured to trigger a protection circuit to increase a frequency or stop a switching operation of the oscillator.

7. The resonant converter of claim 1, wherein the switching cycle is a first switching cycle, and the non-ZVS detection circuit is configured to detect the non-ZVS event in a second switching cycle in response to the voltage of the integrated current sense signal during the second switching cycle being positive at the predetermined time point in the first clock signal.

8. The resonant converter of claim 7, wherein the sensor is configured to receive the first clock signal during the first switching cycle, and sense a half-way time point in the first clock signal during the first switching cycle,
wherein the non-ZVS detection circuit is configured to determine the polarity of the voltage of the integrated current sense signal at the half-way time point in the first clock signal during the second switching cycle using the integrated current sense signal and the half-way time point of the first clock signal during the first switching cycle,
wherein the non-ZVS detection circuit is configured to determine the non-ZVS event during the second switching cycle based on the polarity being positive.

9. The resonant converter of claim 1, further comprising:
an integrated current sense circuit coupled to the resonant network on the primary side of the transformer, the integrated current sense circuit configured to generate the integrated current sense signal.

10. The resonant converter of claim 9, wherein the resonant network includes a resonant capacitor, a resonant inductor, and a magnetizing inductor, and the integrated current sense circuit includes a capacitor divider coupled to the resonant capacitor.

11. A resonant converter for detecting non-zero voltage switching, the resonant converter comprising:
an oscillator configured to generate a first clock signal to drive a first power switch, and a second clock signal to drive a second power switch, each of the first clock signal and the second clock signal being activated during a switching cycle; and
a non-zero voltage switching (non-ZVS) detection circuit configured to receive an integrated current sense signal sensed on a primary side of a transformer of a resonant network,
the non-ZVS detection circuit including a clock sensor configured to generate a sensor signal at a predetermined time point in the first clock signal, and a clock calculator configured to determine a predetermined time point in the second clock signal based on the sensor signal and the second clock signal,
the non-ZVS detection circuit configured to determine a polarity of a voltage of the integrated current sense signal using the predetermined time point in the second clock signal, the predetermined time point being later than an activation time of the second clock signal and being before a deactivation time of the second clock signal,
the non-ZVS detection circuit configured to detect a non-ZVS event in response to the polarity of the voltage of the integrated current sense signal being negative or positive at the predetermined time point in the second clock signal.

12. The resonant converter of claim 11, wherein the predetermined time point in the second clock signal is a halfway time point in the second clock signal during the switching cycle.

13. The resonant converter of claim 11, wherein the non-ZVS detection circuit is configured to detect a ZVS event in response to the polarity of the voltage of the integrated current sense signal being positive at the predetermined time point in the second clock signal.

14. The resonant converter of claim 11, wherein, in response to the detection of the non-ZVS event, the non- ZVS detection circuit is configured to trigger a protection circuit to increase a frequency or stop a switching operation of the oscillator.

15. The resonant converter of claim 11, wherein the resonant network includes a resonant capacitor, a resonant inductor, and a magnetizing inductor.

16. A resonant converter for detecting non-zero voltage switching, the resonant converter comprising:
    an oscillator configured to generate a first clock signal to drive a first power switch, and a second clock signal to drive a second power switch, each of the first clock signal and the second clock signal being activated during a first switching cycle and a second switching cycle, the second switching cycle being after the first switching cycle; and
    a non-zero voltage switching (non-ZVS) detection circuit configured to receive an integrated current sense signal sensed on a primary side of a transformer of a resonant network,
    the non-ZVS detection circuit including a clock sensor configured to sense a predetermined time point in the first clock signal during the first switching cycle,
    the non-ZVS detection circuit configured to determine a polarity of a voltage of the integrated current sense signal using the predetermined time point in the first clock signal during the second switching cycle, the predetermined time point being later than an activation time of the first clock signal and being before a deactivation time of the first clock signal,
    the non-ZVS detection circuit configured to detect a non-ZVS event during the second switching cycle in response to the polarity of the voltage of the integrated current sense signal being positive at the predetermined time point in the first clock signal during the second switching cycle.

17. The resonant converter of claim 16, wherein the predetermined time point in the first clock signal is a halfway time in the first clock signal during the first switching cycle.

18. The resonant converter of claim 16, wherein the resonant network includes a resonant capacitor, a resonant inductor, and a magnetizing inductor.

* * * * *

UNITED STATES PATENT AND TRADEMARK OFFICE
CERTIFICATE OF CORRECTION

PATENT NO. : 10,374,516 B2  
APPLICATION NO. : 15/668974  
DATED : August 6, 2019  
INVENTOR(S) : Moon et al.

Page 1 of 1

It is certified that error appears in the above-identified patent and that said Letters Patent is hereby corrected as shown below:

In the Claims

In Column 14, Line 4, Claim 8, before "sensor" insert -- clock --.

Signed and Sealed this  
Tenth Day of September, 2019

Andrei Iancu  
*Director of the United States Patent and Trademark Office*